D. C. DAVIS.
RAILWAY COUPLING.
APPLICATION FILED JUNE 7, 1913.
1,148,293.
Patented July 27, 1915.
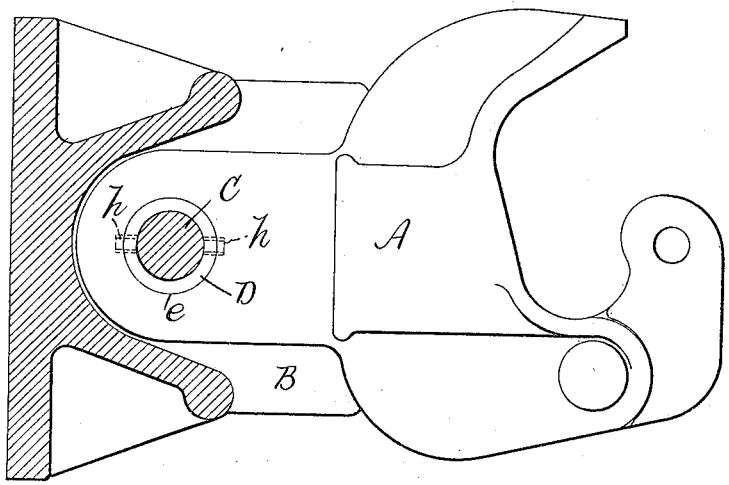
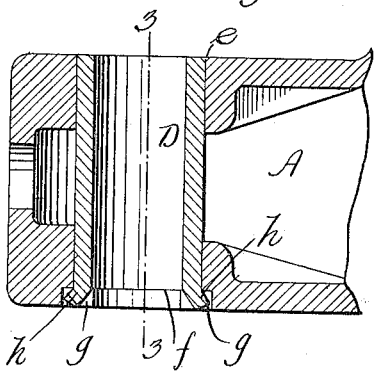
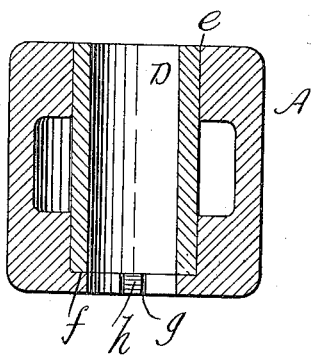
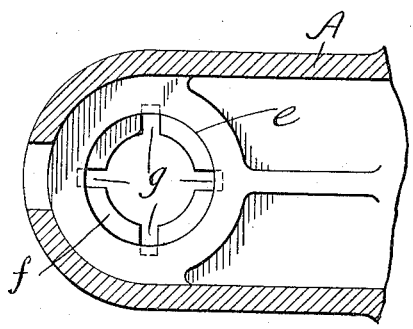
Witnesses
A. G. Dimond
H. G. Robertson
Inventor
Donald C. Davis
by
Wilhelm Parker & Hard
Attorneys.

UNITED STATES PATENT OFFICE.

DONALD C. DAVIS, OF DEPEW, NEW YORK, ASSIGNOR TO GOULD COUPLER COMPANY, OF NEW YORK, N. Y.

RAILWAY-COUPLING.

1,148,293.   Specification of Letters Patent.   Patented July 27, 1915.

Application filed June 7, 1913. Serial No. 772,300.

*To all whom it may concern:*

Be it known that I, DONALD C. DAVIS, a citizen of the United States, residing at Depew, in the county of Erie and State of New York, have invented a new and useful Improvement in Railway-Couplers, of which the following is a specification.

This invention relates more particularly to improvements in couplers of the kind used on railway locomotives and tenders and which are pivoted to swing laterally on a bracket or support on the locomotive or tender, the purpose of the invention being to provide a bushing for the pivot pin of the coupler which is of a construction such that it can be manufactured and applied at the minimum expense, and is adapted to be removably and adjustably secured in place in the pivot hole of the coupler.

In the accompanying drawings: Figure 1 is a plan view, partly in section, of a locomotive or tender coupler and its supporting bracket provided with a bushing embodying the invention. Fig. 2 is a sectional elevation, on an enlarged scale, of the coupler shank. Fig. 3 is a cross section thereof in line 3—3, Fig. 2. Fig. 4 is a horizontal section, on an enlarged scale, of a slightly modified form of the shank.

Like reference characters refer to like parts in the several figures.

A represents a coupler, B the bracket or support by which it is mounted on the locomotive or tender, and C the pin pivotally connecting the coupler to the bracket or support so as to permit the coupler to swing laterally. These parts may be of any usual or desired construction.

D represents the bushing for the pivot pin C. This bushing is secured in a hole $e$ in the shank of the coupler, and the pivot pin passes through the same and through registering holes in the upper and lower parts of the bracket, between which the shank extends. The bushing is cylindrical or of uniform diameter from end to end, preferably both exteriorly and interiorly, thus adapting the bushings to be made very cheaply and expeditiously, either by cutting them in the required lengths from pipings or by casting them. On account of their cylindrical form the bushings can be cast more cheaply than if they were of other shape as the molds can be readily made and the castings withdrawn from the molds quickly and without trouble. The hole $e$ in the shank is cylindrical and of a diameter adapting the bushing to be readily inserted therein, and has a lower end portion of reduced diameter forming a ledge or flange $f$ on which the lower end of the bushing rests, and this ledge is provided with one or more notches $g$ adapted to receive one or more lugs $h$ projecting downwardly from the lower end of the bushing. Before the bushing is placed in the hole the lugs $h$ extend longitudinally therefrom and after inserting the bushing in the hole $e$ in the shank with the lugs entering the notches $g$, the lugs are bent outwardly in the notches and prevent the displacement of the bushing from the hole $e$. The notches $g$ are of sufficient radial length to permit this outward bending of the lugs $h$. The bushing is also prevented from turning in the hole by the engagement of the lugs $h$ in the notches. One or more of the lugs can be provided on the bushing, as desired, the bushing shown having two. When a bushing becomes worn the lugs can be straightened and the bushing driven out of the hole and replaced by a new one.

As the coupler has only a limited lateral swing on the pivot pin, the wear occurs mainly at two opposite places on the bushing, and if desired, four notches $g$ can be provided in the ledge $f$, as shown in Fig. 4, thus enabling a bushing when worn at opposite sides to be released, turned one-quarter of a revolution in the hole $e$ and again secured so as to utilize the unworn portions thereof.

While the bushing is illustrated in connection with the pivot pin for a pivoted coupler, it could be utilized in the same way for a pivot or hinge pin for other parts of a coupler or analogous device, and it is not intended to necessarily restrict the claims to the use of the bushing with the pivot pin that connects the coupler to its supporting bracket.

I claim as my invention:

1. The combination with a coupler provided with a hole therein for a pivot pin and with an inwardly-extending ledge at one end of said hole, and a bushing consisting of a piece of tubing of uniform diameter from end to end located in said hole with one end against said ledge and provided at said end with an integral extension of its tubular wall which interlocks with an adjacent portion of the coupler for holding said bushing from longitudinal and rotary movements in said hole.

2. The combination with a coupler provided with a hole therein for a pivot pin, said hole having an end portion of reduced diameter provided with a notch, and a bushing located in said hole with one end against said reduced end portion thereof, said bushing having a lug which projects from said end thereof into said notch and is adapted to be bent outwardly to retain the bushing in said hole, substantially as set forth.

3. The combination with a coupler provided with a cylindrical hole therein for a pivot pin, said hole having a lower end portion of reduced diameter provided with a notch, and a tubular bushing located in said hole with its lower end resting on said reduced end portion thereof and having a lug which projects from its lower end into said notch and is adapted to be bent to retain the bushing in said hole, said bushing except for said lug being free from lateral projection.

4. The combination with a coupler provided with a hole therein for a pivot pin and an inwardly extending ledge at one end of said hole having a plurality of notches therein, and a bushing located in said hole with one end against said ledge and provided at said end with a lug adapted to project into one or another of said notches for holding said bushing in different positions in said hole and preventing the bushing from turning, substantially as set forth.

5. A pin bushing which consists of a straight piece of tubing provided at one end with a longitudinal extension of its tubular wall adapted to engage a coöperating part for retaining the bushing in a hole, said bushing except for said extension being free from lateral projection.

Witness my hand, this 27th day of May, 1913.

DONALD C. DAVIS.

Witnesses:
ALLEN B. BRIMMER,
FRED LINDHOLM.

Copies of this patent may be obtained for five cents each, by addressing the "Commissioner of Patents, Washington, D. C."